United States Patent [19]

Jordan

[11] 3,970,851
[45] July 20, 1976

[54] SPRAY COOLING FOR INFRARED TELESCOPE
[75] Inventor: William D. Jordan, Dallas, Tex.
[73] Assignee: The United States of America as represented by the Secretary of the Army, Washington, D.C.
[22] Filed: May 20, 1975
[21] Appl. No.: 579,167

[52] U.S. Cl. .............................. 250/352; 62/467 R; 250/338
[51] Int. Cl.[2] ......................... G01J 3/02; F17C 7/00
[58] Field of Search ............... 250/338, 352; 62/61, 62/74, DIG. 9, 467

[56] References Cited
UNITED STATES PATENTS 3,018,643   1/1962   Evers ............................ 250/352 X
3,025,680   3/1962   DeBrosse et al. ............... 250/352 X

*Primary Examiner*—Archie R. Borchelt
*Attorney, Agent, or Firm*—William G. Gapcynski; Lawrence A. Neureither; Jack W. Voigt

[57] ABSTRACT

A detector of an infrared telescope that must be cooled to near 20°–24°K in order to function properly is cooled by spraying a liquid cryogenic fluid through a small nozzle into a vented chamber of subatmospheric pressure to cause the pressure of the cryogenic fluid to be dropped below its fluid triple point pressure and thereby freeze to deposit frozen crystals on the detector and thereby cool the detector to the required temperature for proper functioning of the detector. The frozen crystals deposited on the detector will be sublimed therefrom by the heat leaked and generated in the detector.

6 Claims, 2 Drawing Figures

SPRAY COOLING FOR INFRARED TELESCOPE

BACKGROUND OF THE INVENTION

In the missile industry, there is a need for cooling means for a detector of an infrared telescope. This detector needs to be cooled to near 20°–24°K and this needs to be accomplished while the telescope and missile are spinning. Further, it is desirable to utilize a cooling means that is as simple as possible and does not require elaborate means for reducing the temperature of the medium to produce the cooled effect.

Therefore, it is an object of this invention to provide a simple method of cooling for a detector that includes spraying a cryogenic fluid into a chamber of sub-atmospheric pressure sufficient to cause the cryogenic fluid to be dropped below its triple point pressure and thereby deposit the sprayed cryogenic fluid on the detector as frozen crystals.

Another object of this invention is to provide a cooling means in which the detector is effectively cooled with the detector in a spinning motion.

A further object of this invention is to provide a simple cooling system that utilizes the low pressure atmosphere that the device is launched into in order to effect cooling and freezing of the cryogenic fluid.

Still another object of this invention is to provide a cryogenic fluid, such as neon, that can have the pressure thereof dropped below its fluid triple point pressure in order to freeze the neon as it is being sprayed onto one side of the detector element to effect appropriate cooling of the detector.

Yet another object of this invention is to provide a cooling arrangement in which the mass stability of the device is maintained as the detector is being cooled.

Still further objects and advantages of this invention will be obvious to those skilled in this art.

SUMMARY OF THE INVENTION

In accordance with this invention, a missile with an infrared telescope that has a detector therein is provided and the detector is cooled by spraying a cryogenic fluid on one surface of the detector in the form of frozen crystals. The detector surface being disposed in a chamber having a pressure sufficiently low that the cryogenic fluid will be dropped below its triple point pressure and thereby cause the frozen crystals to be formed. Heat from the detector element is transferred to the frozen crystals and causes the frozen crystals to be sublimed away. With this arrangement, the detector element can be adequately cooled for substantial period of operation and accomplish the objectives of the invention.

DESCRIPTION OF THE PREFERRED EMBODIMENT

Figure 1:
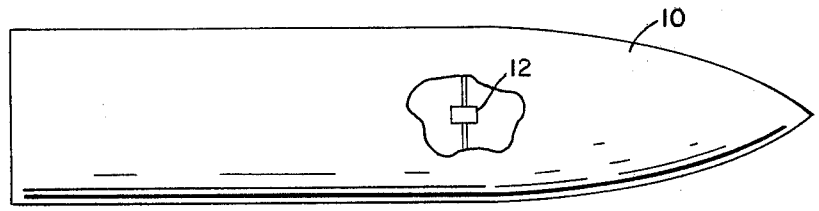
FIG. 1 is a perspective view partially cut away of a missile with an infrared detector device according to this invention.

Referring now to FIG. 1, missile 10 is illustrated that is adapted to be launched into space and missile 10 contains an infrared detector device 12 therein.

Figure 2:
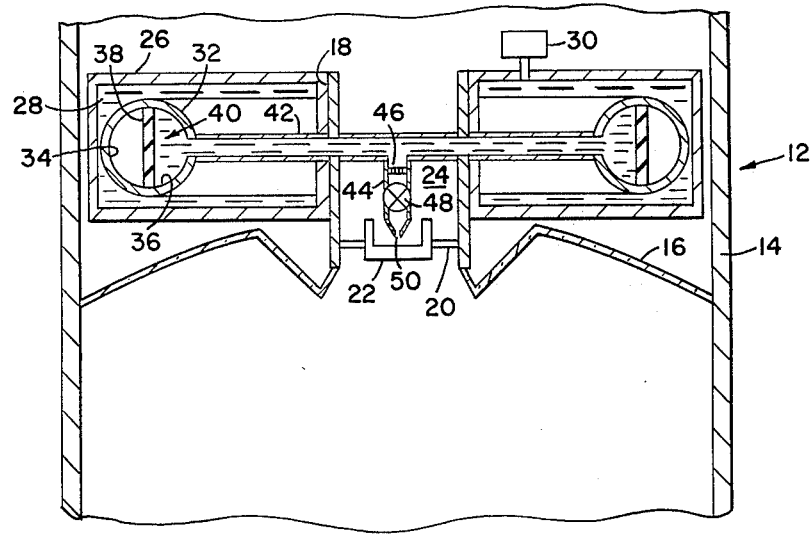
FIG. 2 is a sectional view partially cut away and illustrating a detector and the spray cooling thereof according to this invention.

Infrared detector device 12 as shown in FIG. 2 includes housing 14 with mirrors 16 mounted therein, housing structure 18 connected to the inner portion of mirror 16, and insulation 20 interconnecting detector element 22 with housing 18 to form chamber space 24 at one side of detector element 22. Chamber 24 is open to the atmosphere through appropriate openings in missile 10 (not shown).

Detector element 22 for detecting infrared radiation must be cooled and maintained at a low temperature of about 20°–24°K in order to function properly. To maintain this temperature of detector element 22, a spray cooled cryogenic fluid arrangement is provided. The spray cool cryogenic fluid arrangement includes a liquid reservoir 26 with cryogenic fluid 28, such as neon, therein and with a pressure controlled relief valve arrangement 30 for maintaining the pressure in reservoir 28 near 8 psia in order to provide cooling of cryogenic fluid 28 at a temperature slightly above the fluid triple point which is approximately 24.55°K and 6.28 psia. A toroidal shaped tank 32 is mounted in reservoir 26 in a conventional manner and has compartments 34 and 36 separated by a diaphragm 38. Diaphragm 38 is mounted in tank 32 in a conventional manner. Cryogenic fluid 40, such as neon, is contained in chamber 36 and is maintained under pressure by preloading diaphragm 38 or by placing a gas such as helium in chamber 34. The pressure exerted by the gas in chamber 34 or by the resiliency of diaphragm 38 should be sufficient to maintain a pressure of 15 psia on cryogenic fluid 40 in chamber 36 at all times. Fluid passages 42 interconnect tank 32 to outlet control section 44 which contains a filter 46, on-off control valve 48 and nozzle orifice 50. Cryogenic fluid 40 is preferably ultra-clean neon for the spray system and filter 46 is provided in order to filter out any impurities that might be in the system that would clog orifice 50. Orifice 50 should have a diameter on the order of about 0.002 inches for a detector surface area of about 0.1 square inches. In a system of this size, with an operational cycle of about four minutes, the heat load will be relatively low in the order of less than about two BTU/Hour and will require about 0.01 pounds of neon to keep the detector in the 20°–24°K region.

In operation, with missile 10 launched into the upper atmosphere and space 24 of detector 12 exposed to the upper atmospheric pressure, the cryogenic fluid in reservoir 26 is maintained by valve control 30 at a pressure of about eight psia to precool the neon fluid 40 and 28. At the desired time to make the appropriate detection with infrared detector 12, on-off valve 48 is opened and liquid neon 40 is forced through orifice 50 and into the atmosphere of space 24 which causes the neon to be dropped below its fluid triple point pressure and thereby flash freeze and create crystals in the form of snow particles which will deposit on one surface of detector 22. The solid snow particles deposited on detector element 22 will build up and sublime. The cooled temperature of element 22 will stabilize at some equilibrium point dictated by the local back pressure in space 24. The back pressure will be the pressure required to vent the gas generated during freezing and sublimation caused by the heat leaked and generated in detector element subassembly 22. This heat load is relatively low in the order of less than 2 BTU/Hour. Also, since the neon liquid 40 is dispensed from a toroidal shaped tank 32, the spray freezing arrangement is maintained in mass stability during use and does not effect missile 10. On-off valve 48 and control valve 30 are conventional valves that are controlled as desired.

I claim:

1. A method of cooling an infrared detector element comprising subjecting one side of said detector element to a chamber space of low pressure, and spraying a cryogenic fluid into said chamber space and toward said one surface of said detector element, said low pressure of said chamber being sufficiently low to cause said cryogenic fluid to be dropped below its triple point pressure and thereby cause said cryogenic fluid to flash freeze and deposit on said one surface of said detector element to thereby cool said detector element, said cryogenic fluid being neon.

2. A method as set forth in claim 1, wherein said cryogenic fluid is precooled by being submerged in a container of the same cryogenic material that is maintained at a pressure above the fluid triple point pressure of the cryogenic fluid by control valve means.

3. A method as set forth in claim 2, wherein said detector element and said cryogenic fluid are in a missile that is spinning in the upper atmosphere, said low pressure in said chamber is from the atmosphere itself, and said detector element is a detector for infrared energy.

4. In an infrared detector for detecting infrared energy, an infrared detector element mounted therein with a cooling arrangement mounted at one surface of said detector element, said cooling arrangement including a toroidal tank interconnected through an on-off valve to a spray nozzle that is located adjacent said one surface of said detector element for spraying cryogenic fluid onto said one surface of said detector element.

5. In an infrared detector as set forth in claim 4, wherein said toroidal tank has cryogenic neon liquid therein that is under pressure and said toroidal tank is mounted in a main neon reservoir tank with neon therein, and control means for maintaining the pressure on said main reservoir tank at a pressure of about 8 psia.

6. In an infrared detector as set forth in claim 5, wherein a filter is mounted before the on-off valve to filter the neon liquid, wherein said toroidal tank is divided into chambers by a diaphragm, and wherein said neon liquid is ultra-clean.

* * * * *